July 4, 1961 R. S. CATALDO 2,990,902
AUTOMATIC CAR CONTROL SYSTEM
Filed Nov. 3, 1958 2 Sheets-Sheet 1

INVENTOR.
Roy S. Cataldo
BY
D. R. Sadler
ATTORNEY

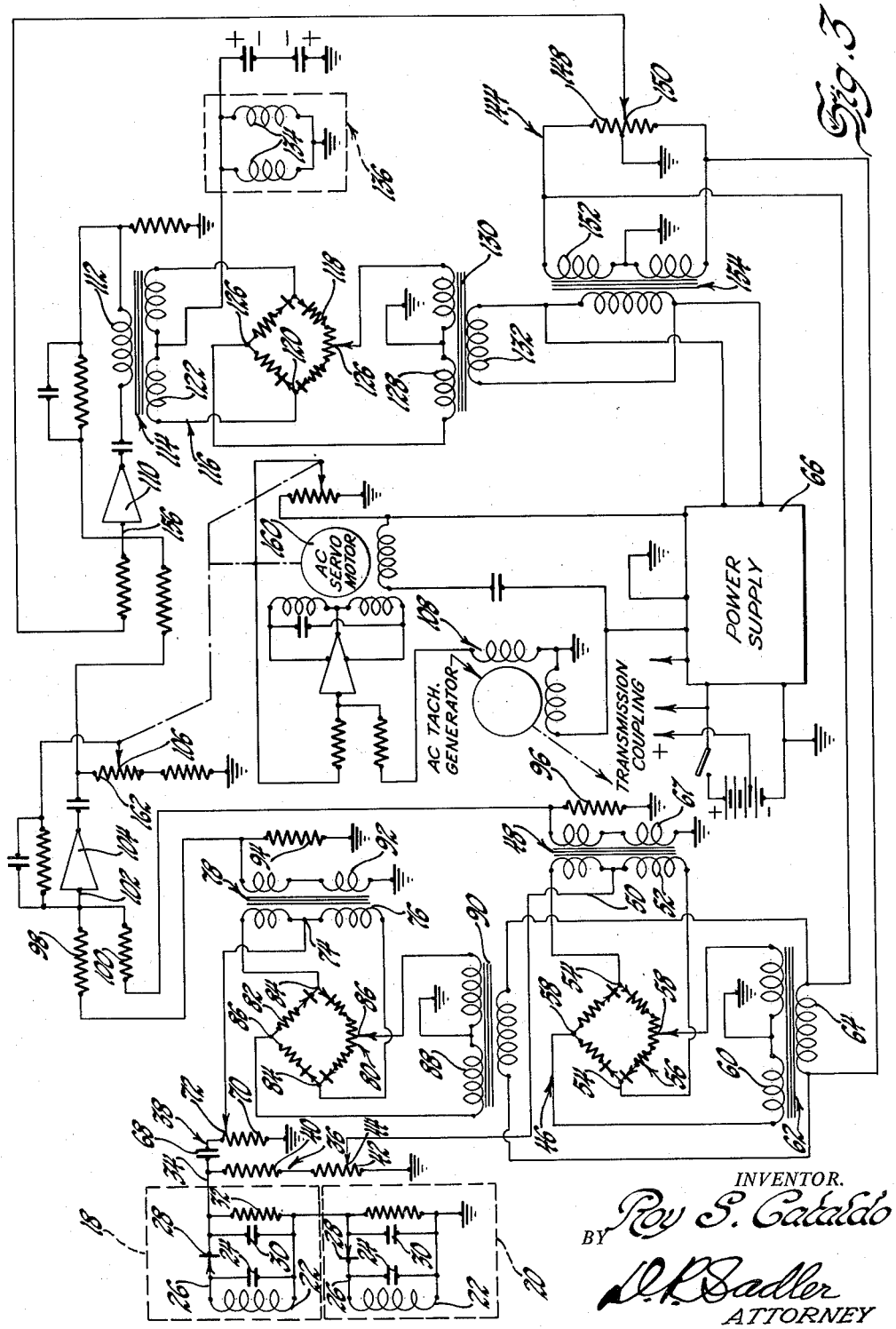

United States Patent Office 2,990,902
Patented July 4, 1961

2,990,902
AUTOMATIC CAR CONTROL SYSTEM
Roy S. Cataldo, Birmingham, Mich., assignor to General Motors Corporation, Detroit, Mich., a corporation of Delaware
Filed Nov. 3, 1958, Ser. No. 771,294
2 Claims. (Cl. 180—79.2)

The present invention relates to automotive vehicles and, more particularly, to means for automatically controlling the operation of such a vehicle.

In the past numerous attempts have been made to automatically control the operation of automotive vehicles and thereby relieve the operator of the burden of driving. Such systems normally employ a signal source such as a cable buried beneath the surface of the road to define the path the vehicles are to follow. Any vehicles that are equipped to be automatically controlled by the system are provided with one or more pickup means that are effective to sense the control signal and to maintain the vehicle on the predetermined path in response thereto.

Although the foregoing systems have been effective to guide the vehicle along a predetermined path, they have been unable to anticipate sudden changes in the direction of the path the vehicle is to follow or to anticipate erratic movements of the vehicle, i.e., swerving from a gust of wind, etc. As a result, under certain circumstances, the foregoing systems may respond too slowly to compensate for the dynamic characteristics of the vehicle and thereby fail to insure a smooth operation. As a consequence, the vehicle will tend to be over-controlled and erratic in its operation.

In order to overcome the foregoing difficulties, it is proposed to provide an automatic control system having means therein which will, in effect, anticipate the required corrective actions and will modify the response of the system in accordance therewith. More particularly, the means will be effective to modify the corrective actions produced by the system in response to the rate of change of the displacement of the vehicle from the predetermined path, the speed at which the vehicle is traveling and/or any other operating characteristics of the vehicle for which it may be desirable to compensate. When an automatically controlled vehicle enters a curved portion of its path, it will normally tend to continue in a straight line as it enters the curve. As a result, the rate at which the vehicle is displaced from the predetermined path will be considerably higher than will occur from the random deviations that normally occur when the vehicle is traveling in a straight line. Also, in the event the vehicle skids, swerves from a gust of wind or is otherwise deflected, there will be an increase in the rate of change of the displacement from the present path. In the present system this increase in the rate of displacement will produce a corresponding increase in the amount of steering correction that will be produced by a given displacement. As a result, the system will respond very quickly whenever the vehicle starts to deviate from the path by more than a normal amount.

As the speed of the vehicle increases, a given amount of steering action will result in increasing lateral accelerations and over-controlling of the vehicle. Accordingly, the present system is also effective to modify the amount of steering correction as a reciprocal of the square of the speed of the vehicle. Thus, the lateral acceleration of the vehicle resulting from any given amount of corrective action will remain substantially constant.

In the drawings:

FIGURE 3 is a wiring diagram of the electronic portions of the control system illustrated in FIGURE 2.

Figure 1:
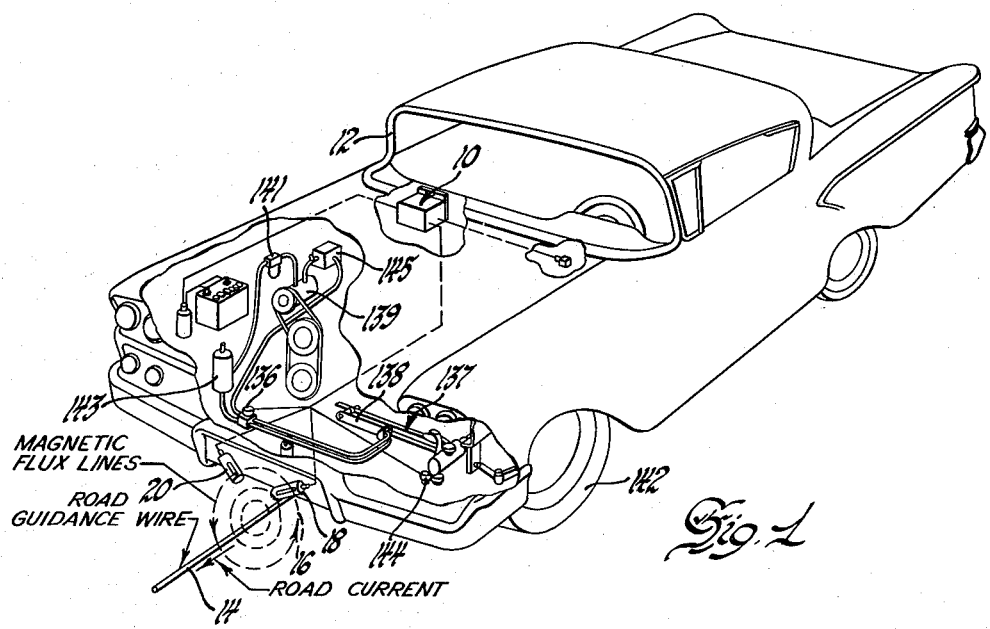
FIGURE 1 is a perspective view of an automotive vehicle, embodying the present invention, with portions thereof being broken away.
Figure 2:
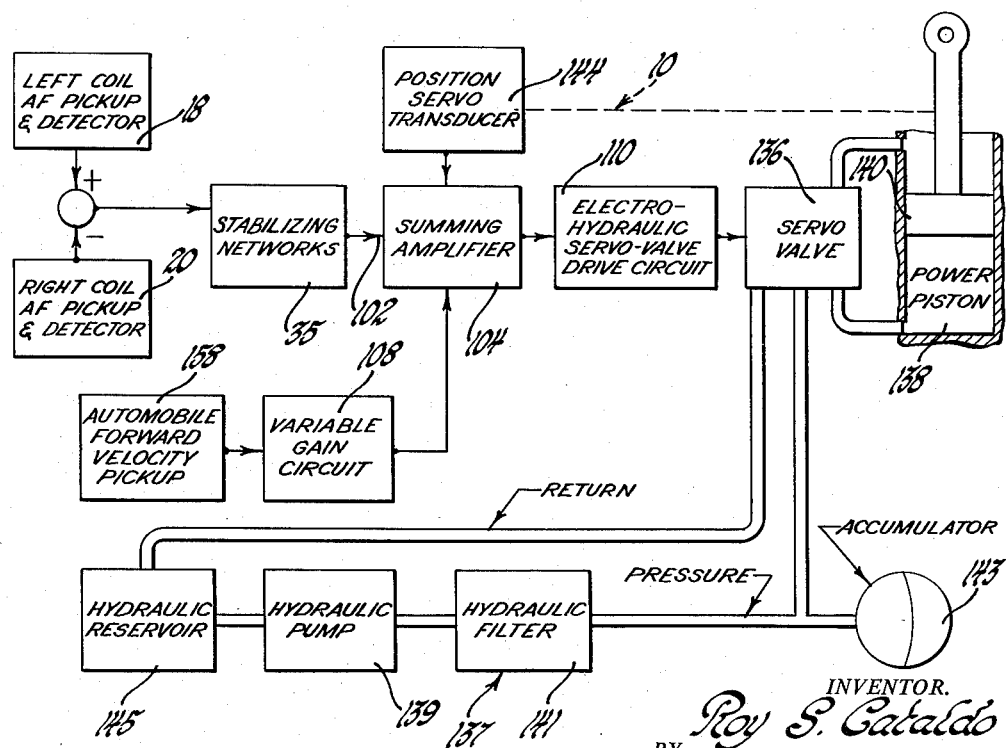
FIGURE 2 is a block diagram of a vehicle control system incorporating the present invention.

The present invention is embodied in a control system 10 such as disclosed and claimed in copending application Serial No. 756,827, Vehicle Control System, filed August 25, 1958 in the name of Garrard Mountjoy and assigned to the assignee of the present invention. This system 10 is particularly adapted for automatically guiding an automotive vehicle 12 along a predetermined course that is defined by a guidance or control cable 14 buried beneath the surface of the roadway. The cable 14 extends along the center line of the path and carries an alternating electric current that produces an alternating electromagnetic flux field 16. This alternating field 16 is in an elongated pattern that is radiated above the surface of the roadway and extends along the center of the roadway.

Any vehicles 12 that are equipped to be automatically controlled by the present system 10 include a pair of pickup units 18 and 20 that are inconspicuously mounted on the front end of the vehicle 12 so as to be disposed on the opposite sides of the cable 14. Both pickups 18 and 20 are substantially identical and, accordingly, only one will be described in detail.

The pickup comprises an inductive coil 22 that is positioned in the magnetic field and is wound so as to have an alternating voltage signal induced therein as a result of the alternating flux 16. It should be noted that the amplitude of this voltage signal will be a function of the distance between the coil 22 and the cable 14. However, the sensitivity of the pickup may be increased by means of a condenser 24 disposed across the coil 22 to form a resonant tank circuit 26 tuned to the frequency of the current in the cable 14.

A rectifier element 28 and a condenser 30 may be mounted inside of the pickup or elsewhere on the vehicle so as to be electrically connected in series with each other and across the tank circuit 26. The condenser 30 will thereby acquire a D.C. charge that will be a function of the voltage induced in the tank circuit 26. A bleed resistor 32 is placed across the condenser 30 for dissipating the charge on the condenser 30. If the time constant is long compared to the frequency of the current in the cable 14 but sufficiently short compared to the frequency of the random changes in the vehicle's course, the charge on the condenser 30 will closely follow the average voltage induced in the coil.

It may thus be seen that, if both pickups 18 and 20 are equally displaced from the cable 14, equal voltages will be induced in the two tank circuits 26 and the condensers 30 will have equal charges thereon. However, if the vehicle 12 is displaced in either direction from the preset path, one pickup 18 or 20 will be closer to the cable 14 than the other. As a consequence, the voltage signal induced in one coil 22 will be larger and the charge on the associated condenser 30 will be greater than on the other.

The electrical circuits for the two pickups are connected in series with one end of the resultant circuit being grounded and the other end thereof forming the output 34 from the pickups 18 and 20. It should be noted that the rectifier elements 28 are connected to cause the individual charges on the condensers 30 to oppose each other and, as a result, the total charge across both condensers 30 will be zero when the pickups 18 and 20 are equally spaced from the cable 14. However, in the event the vehicle 12 is displaced from the path, the charge on one condenser 30 will be greater than on the other condenser 30 and, accordingly, the total charge present at the output from the two pickups 18 and 20 will be indicative of the amount of displacement of the vehicle 12 and the polarity will be indicative of the direction of displacement.

The output 34 from the pickups is interconnected with a stabilizing network 35 having a voltage divider 36 and a differentiating circuit 38. In the present instance, the voltage divider 36 includes a fixed resistor 40 and a potentiometer 42 having a movable center tap 44, whereby it will produce an error signal that will be indicative of the amount and direction of displacement of the vehicle from the preset path. This error signal will be a D.C. signal and, if D.C. circuitry is to be employed, the D.C. error signal may be employed as such. However, in the present instance, it is preferable to employ A.C. circuitry and, accordingly, the D.C. error signal is converted to an A.C. error signal by a suitable modulator. The modulator 46 is of the so-called ring or bridge type and includes a transformer 48 that has the center 50 of the primary 52 interconnected with the center tap 44 of the potentiometer 42. The opposite ends of the primary 52 are connected to one pair of corners 54 in the bridge circuit 56. The conjugate corners 58 of the bridge 56 are interconnected with the secondary 60 of the control transformer 62. The control transformer primary 64 is interconnected with an A.C. power supply 66 having a constant carrier frequency. The voltage from the secondary 60 will alternately block the various legs of the bridge 56 and, as a consequence, the output from the secondary 67 of the first transformer 48 will be an A.C. error signal having a frequency identical to the carrier frequency. The amplitude of the A.C. signal is proportional to the D.C. error signal from the center tap 44 and the phase will be shifted 180° with reversals in the polarity of the D.C. signal.

The differentiating circuit 38 includes a condenser 68 and a potentiometer 70 having a variable center tap 72 thereon. The center tap 72 will thus provide a D.C. signal having a potential and polarity corresponding to the rate of change of the signal from the pickups 18 and 20, i.e., the rate at which the vehicle 12 is being displaced from the path. Since the present system employs A.C. components, the center tap 72 is interconnected with the center 74 of the primary 76 of transformer 78 in a second bridge or ring type modulator 80. This modulator is similar to the first modulator in that it includes a bridge circuit 82 having one pair of opposite corners 84 thereof connected to the ends of the primary 76 and the conjugate pair of corners 86 connected to the secondary 88 of a control transformer 90. The primary of this transformer is interconnected with the power supply so as to have a carrier frequency current therein. As a consequence, the output of the secondary 92 will be an A.C. signal of carrier frequency and have an amplitude coresponding to the rate of change of the error signal. The A.C. error displacement signal and the A.C. rate of change signals will be in or out of phase if the corresponding D.C. signals are respectively of the same or reversed polarities.

The two secondary windings 67 and 92 of both transformers 48 and 78 are connected to load resistors 94 and 96 and coupling resistors 98 and 100 leading to the input 102 of a summing amplifier 104. This is a conventional amplifier effective to additively combine the two A.C. signals and produce an amplified output signal. The amplifier 104 preferably has a variable gain that is controlled by the position of the center tap 106. The position of the center tap 106 is controlled by means of a speed responsive servo 108 that will be explained in more detail hereinafter. It may thus be seen that the output of the amplifier 104 will be the A.C. corrected error signal increased or decreased by an amount corresponding to the A.C. rate of change signal. If the D.C. signals are of the same polarity, the A.C. signals will be in phase and will add, but if the D.C. signals are of reversed polarity, the A.C. signals will be out of phase and will subtract.

The output of the summing amplifier 104 is capacitively coupled to the input of a servo amplifier 110. The output of the servo amplifier 110 is connected to the primary 112 of a transformer 114 in a bridge or ring type demodulator circuit 116. The bridge circuit 118 has one pair of opposite corners 120 thereof connected to the secondary 122 of the transformer 114, while the conjugate corners 126 are connected to the secondary 128 of a control transformer 130. The primary 132 of this transformer 130 is connected to the power supply 66 and, accordingly, is energized at the carrier circuit. As a result, the output of the demodulator 116 is a D.C. signal having an amplitude and polarity corresponding to the amplitude and phase of the A.C. corrected error signal. The output of the servo demodulator 116 is connected to a pair of coils 134 in a servo hydraulic control valve means 136 in the power steering ssytem 137. The steering system 137 includes a pump 139, a filter 141, an accumulator 143 and a reservoir 145. This servo valve 136 will be effective to regulate the flow of hydraulic fluid into a hydraulic cylinder 138 containing a power piston 140 that is operatively connected to the steering system 137. As a result, this valve 136 is effective to control the movement of the dirigible wheels 142 on the front end of the vehicle 12 and thereby determine the direction of travel.

A wheel position transducer 144 is operatively interconnected with the steering linkage so as to be responsive to the movement of the wheels 142. This transducer 144 comprises a potentiometer 148 having the center tap 150 mechanically connected with the steering linkage and having the opposite ends thereof electrically connected across the secondary 152 of a transformer 154 energized from the power supply 66. Thus, the potentiometer will feed into the input 156 of the servo amplifier 110 a signal that will have an amplitude indicative of the amount of displacement of the dirigible wheels 142 from the straight ahead position and a phase indicative of the direction. Thus, a closed feedback loop is formed and the amplifier 110 will continue to actuate the hydraulic valve 136 until the signal from the summing amplifier 104 and the signal from the transducer 144 are equal but opposite. As a result, the dirigible wheels 142 will be set to correspond to the corrected error signal and the vehicle 12 will be guided in response thereto.

As previously stated, the gain of the amplifier 104 is controlled by means of a speed responsive servo 108. This servo 108 includes a tachometer 158 driven from the transmission or any other suitable source so as to produce an A.C. output signal indicative of the speed of the vehicle 12. This speed signal is fed into a servo motor 160 that mechanically varies the position of a center tap 106 in the potentiometer 162. This is effective to regulate the amount of signal fed back into the input 102 of the amplifier 104. As a result, the gain or amplification produced by the amplifier 104 will vary with the speed of the vehicle 12. It is well-known that the centrifugal force produced whenever the vehicle 12 turns is a function of the square of the vehicle velocity. Accordingly, the gain of the amplifier 104 is preferably varied as the reciprocal of the square of the vehicle velocity. Thus, for any given turning radius for the vehicle, the lateral acceleration of the vehicle will be constant irrespective of the speed of the vehicle.

It may, therefore, be seen that, in the event a vehicle 12 equipped with the present invention is traveling along a predetermined path defined by the cable 14, the two pickups 18 and 20 will have signals induced therein. The total of these signals will appear in the output 34 from the pickups 18 and 20 as an error signal and will be indicative of the direction and amount of displacement of the vehicle 12 from the path. This error signal will be fed through the summing amplifier 104 and servo amplifier 110. This, in turn, will cause the hydraulic system to position the dirigible wheels 142 so as to return the vehicle 12 to the predetermined path. The amount of movement of the dirigible wheels 142 from their straight ahead position will be determined by the amplitude of the error signal and the extent to which it is modified by the velocity of the vehicle 12 and the rate at which the vehicle 12 is being displaced from the cable 14.

More particularly, if the vehicle 12 is traveling at a high rate of speed, the amount of steering correction will be reduced as the inverse of the vehicle velocity. Consequently, the lateral acceleration of the vehicle 12 will be prevented from becoming excessive and will thereby provide a smooth corrective action.

When the vehicle 12 is properly following the cable 14, there will be only minor random deviations from the path and the rate at which the displacement occurs will be comparatively low. Consequently, the error signal will be substantially entirely responsible for any steering corrections. However, in the event the vehicle 12 is suddenly displaced from the path as a result of a cross wind, skidding, a turn in the path, etc., the rate of change of the error signal will be high. Consequently, the differentiating circuit 38 will supply a correspondingly large signal to the input 102 of the summing amplifier 104. This will modify the error signal to more rapidly return the vehicle 12 to the predetermined path.

It may, therefore, be seen that the present control system will be very stable and able to respond very quickly and accurately to any conditions requiring a corrective steering action.

It is to be understood that, although the invention has been described with specific reference to a particular embodiment thereof, it is not to be so limited since changes and alterations therein may be made which are within the full intended scope of this invention as defined by the appended claims.

What is claimed is:

1. In an automatic steering system for a vehicle which is adapted to follow a predetermined path, vehicle-mounted pickup means adapted to provide a first signal related to the deviation of the vehicle from said path and to provide a second signal related to the rate of change of said deviation, a summing amplifier connected to receive said first and second signals and adapted to produce an output signal related to the sum thereof, tachometer means for providing a third signal related to vehicle speed, said summing amplifier being connected to said tachometer means to receive said third signal such that the gain of said amplifier is varied as an inverse function of vehicle speed, and servo positioning means having an input connected to said amplifier and having an output connected to the wheels of said vehicle to vary the position thereof in response to said output signal.

2. In an automatic steering system for a vehicle which is adapted to follow a predetermined path, vehicle-mounted pickup means adapted to provide a first signal related to the deviation of the vehicle from said path and to provide a second signal related to the rate of change of said deviation, a summing amplifier connected to receive said first and second signals and adapted to produce an output signal related to the sum thereof, negative feedback means connecting the output of said amplifier with the input thereof, tachometer means for providing a third signal related to vehicle speed, said feedback means being connected to said tachometer means such that the portion of said output signal applied to the amplifier input is varied as a direct function of said third signal, and servo positioning means having an input connected to said amplifier and having an output connected to the wheels of said vehicle to vary the position thereof in response to said output signal.

References Cited in the file of this patent
UNITED STATES PATENTS

| | | |
|---|---|---|
| 2,339,291 | Paulus et al. | Jan. 18, 1944 |
| 2,487,618 | Twyman | Nov. 8, 1949 |
| 2,493,755 | Ferrill | Jan. 10, 1950 |
| 2,702,342 | Korman | Feb. 15, 1955 |
| 2,760,590 | Stolte | Aug. 28, 1956 |
| 2,847,080 | Zworykin et al. | Aug. 12, 1958 |
| 2,851,795 | Sherman | Sept. 16, 1958 |
| 2,865,462 | Milliken | Dec. 23, 1958 |